(12) United States Patent
Suzuki et al.

(10) Patent No.: US 12,489,293 B2
(45) Date of Patent: Dec. 2, 2025

(54) GUIDANCE DEVICE FOR SELECTING SAFETY FACTORY, GUIDANCE METHOD FOR SELECTING SAFETY FACTORY, AND METHOD OF OPERATING FACTORY

(71) Applicant: JFE STEEL CORPORATION, Tokyo (JP)

(72) Inventors: Katsuya Suzuki, Tokyo (JP); Shuji Kuyama, Tokyo (JP); Aoto Miyazaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 523 days.

(21) Appl. No.: 17/910,750

(22) PCT Filed: Mar. 15, 2021

(86) PCT No.: PCT/JP2021/010407
§ 371 (c)(1),
(2) Date: Jan. 25, 2023

(87) PCT Pub. No.: WO2021/187428
PCT Pub. Date: Sep. 23, 2021

(65) Prior Publication Data
US 2023/0246439 A1 Aug. 3, 2023

(30) Foreign Application Priority Data
Mar. 17, 2020 (JP) .................. 2020-045927

(51) Int. Cl.
*H02J 3/14* (2006.01)
*H02J 13/00* (2006.01)

(52) U.S. Cl.
CPC .......... *H02J 3/14* (2013.01); *H02J 13/00001* (2020.01); *H02J 2203/20* (2020.01); *H02J 2310/12* (2020.01)

(58) Field of Classification Search
CPC ............ G06Q 10/0631; Y02B 70/3225; Y04S 20/222; Y04S 10/50; G05B 2219/2639;
(Continued)

(56) References Cited

U.S. PATENT DOCUMENTS 4,551,812 A * 11/1985 Gurr ....................... H02J 3/003
307/35
8,068,938 B2 * 11/2011 Fujita ..................... G06Q 10/04
700/297
(Continued)

FOREIGN PATENT DOCUMENTS

CN 104137384 A 11/2014
JP S61-221535 A 10/1986
(Continued)

OTHER PUBLICATIONS

Oct. 17, 2024 Office Action issued in Korean Patent Application No. 10-2022-7030905.
(Continued)

*Primary Examiner* — Darrin D Dunn
(74) *Attorney, Agent, or Firm* — Oliff PLC

(57) ABSTRACT

A guidance device selects a safety factory operating at a time of a power failure, and presents a safety operation plan for a plurality of factories in a power system, and includes a presentation unit configured to calculate a combination of an operating factory and a non-operating factory within a predetermined period from a planned value of power demand-supply of the factories such that a power consumption amount of the factories satisfies a predetermined condition, and present information on the calculated combination.

4 Claims, 7 Drawing Sheets

(58) Field of Classification Search
CPC .. G05B 17/02; G05B 19/042; G05B 19/0426; G06F 1/305; G06F 11/008; G06F 11/0709; G06F 11/0793; G06F 11/3006; G06F 16/00

See application file for complete search history.

(56) References Cited

U.S. PATENT DOCUMENTS

| | | | | |
|---|---|---|---|---|
| 8,712,558 | B2* | 4/2014 | Ingels | G06F 1/266 700/295 |
| 10,886,740 | B2* | 1/2021 | Yin | H02J 13/00024 |
| 2010/0312414 | A1* | 12/2010 | Kumar | H02J 3/144 700/295 |
| 2011/0029142 | A1 | 2/2011 | Sun et al. | |
| 2012/0166008 | A1 | 6/2012 | Jeong | |
| 2013/0110305 | A1* | 5/2013 | Meyerhofer | G06Q 30/06 713/320 |
| 2014/0371942 | A1 | 12/2014 | Matsuyama et al. | |
| 2015/0019275 | A1* | 1/2015 | Koch | G06Q 10/0631 705/7.12 |
| 2015/0170171 | A1* | 6/2015 | McCurnin | G06N 5/04 705/7.31 |
| 2015/0323921 | A1* | 11/2015 | Saito | G06Q 10/06 700/291 |
| 2016/0285275 | A1 | 9/2016 | Hisada et al. | |
| 2017/0018923 | A1* | 1/2017 | Rombouts | G06Q 50/06 |
| 2020/0133752 | A1* | 4/2020 | Ganesan | G06F 1/28 |
| 2022/0020038 | A1* | 1/2022 | Finkel | G06F 16/00 |
| 2024/0097446 | A1* | 3/2024 | Biswas | H02J 13/00002 |

FOREIGN PATENT DOCUMENTS

| | | |
|---|---|---|
| JP | H03-276201 A | 12/1991 |
| JP | 2012-228036 A | 11/2012 |
| JP | 2013-100153 A | 5/2013 |
| JP | 2014-233136 A | 12/2014 |
| JP | 2015-095925 A | 5/2015 |
| WO | 2014/038327 A1 | 3/2014 |

OTHER PUBLICATIONS

May 18, 2021 International Search Report issued in International Patent Application No. PCT/JP2021/010407.

Aug. 16, 2023 extended Search Report issued in European Patent Application No. 21770462.6.

Mar. 21, 2025 Office Action issued in Chinese Patent Application No. 202180019883.9.

Concise Handbook for Water Supply and Drainage Workers. Chapter 12, p. 516. Mar. 10, 2025.

Aug. 8, 2025 Office Action issued in Chinese Patent Application No. 202180019883.9.

Yuhui, Zhou, "Power Industry Energy Conservation and Emission Reduction Target Management", Beijing Jiaotong University Press, p. 94, Jul. 31, 2008.

"Beijing Energy Development Research Report", Report of Beijing Philosophy and Social Science Research Base, Tongxin Press, p. 112, May 31, 2007.

* cited by examiner

FIG.4

| TIME | HOT ROLL-ING | THICK PLATE | AP | CON-TINU-OUS CAST-ING | SIN-TER-ING | ELEC-TRIC FUR-NACE | LARGE-DIAME-TER TUBE | SMALL-DIAME-TER TUBE | OXY-GEN CEN-TER | COLD ROLL-ING | CON-VERT-ER | BLAST FUR-NACE BLOW-ER | SHAFT FUR-NACE | 2 BLAST FUR-NACE | RH | SUB-SIDI-ARY A | SUB-SIDI-ARY B | PICK-LING FAC-TORY | CEN-TRAL OFFICE | BLOOM-ING RE-FINING | SUB-SIDI-ARY C | OTH-ERS | TIME |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 3 |
| 4 | 0 | 0 | 0 | 0 | 1 | 0 | 0 | 0 | 1 | 0 | 0 | 1 | 0 | 0 | 0 | 0 | 0 | 0 | 0 | 0 | 0 | 0 | 4 |
| 5 | 0 | 0 | 0 | 1 | 1 | 1 | 0 | 0 | 1 | 0 | 0 | 1 | 0 | 0 | 1 | 0 | 0 | 1 | 0 | 1 | 0 | 0 | 5 |
| 6 | 0 | 0 | 0 | 0 | 1 | 0 | 1 | 0 | 1 | 0 | 0 | 1 | 0 | 0 | 0 | 0 | 0 | 1 | 0 | 1 | 0 | 0 | 6 |
| 7 | 0 | 0 | 0 | 0 | 1 | 1 | 0 | 1 | 1 | 1 | 0 | 1 | 1 | 0 | 1 | 0 | 0 | 0 | 0 | 0 | 0 | 1 | 7 |
| 8 | 0 | 0 | 0 | 0 | 1 | 0 | 1 | 1 | 1 | 0 | 0 | 1 | 0 | 0 | 0 | 0 | 1 | 0 | 0 | 0 | 0 | 0 | 8 |
| 9 | 0 | 0 | 0 | 0 | 1 | 0 | 0 | 0 | 1 | 0 | 0 | 1 | 0 | 0 | 1 | 0 | 1 | 1 | 0 | 0 | 1 | 1 | 9 |
| 10 | 1 | 0 | 0 | 0 | 1 | 0 | 1 | 1 | 1 | 0 | 0 | 1 | 0 | 0 | 1 | 0 | 0 | 0 | 1 | 1 | 0 | 1 | 10 |
| 11 | 1 | 0 | 0 | 0 | 1 | 0 | 0 | 0 | 1 | 0 | 0 | 1 | 0 | 0 | 0 | 0 | 1 | 1 | 0 | 1 | 0 | 0 | 11 |
| 12 | 1 | 0 | 0 | 0 | 1 | 0 | 1 | 0 | 1 | 0 | 0 | 1 | 0 | 0 | 1 | 0 | 0 | 1 | 0 | 1 | 0 | 1 | 12 |
| 13 | 1 | 0 | 0 | 0 | 1 | 0 | 0 | 0 | 1 | 0 | 0 | 1 | 0 | 0 | 0 | 0 | 0 | 1 | 0 | 1 | 0 | 1 | 13 |
| 14 | 1 | 0 | 0 | 1 | 1 | 0 | 0 | 0 | 1 | 1 | 0 | 1 | 0 | 0 | 1 | 0 | 1 | 1 | 0 | 0 | 0 | 1 | 14 |
| 15 | 0 | 0 | 0 | 0 | 1 | 0 | 0 | 1 | 1 | 0 | 0 | 1 | 0 | 0 | 1 | 0 | 0 | 1 | 0 | 0 | 0 | 0 | 15 |
| 16 | 1 | 0 | 0 | 0 | 1 | 1 | 0 | 0 | 1 | 1 | 0 | 1 | 0 | 0 | 0 | 0 | 0 | 1 | 0 | 1 | 0 | 1 | 16 |
| 17 | 1 | 0 | 0 | 0 | 1 | 0 | 1 | 1 | 1 | 0 | 0 | 1 | 1 | 0 | 1 | 0 | 1 | 0 | 0 | 0 | 0 | 0 | 17 |
| 18 | 1 | 0 | 0 | 0 | 1 | 0 | 0 | 0 | 1 | 0 | 0 | 1 | 0 | 0 | 0 | 0 | 0 | 1 | 0 | 1 | 0 | 1 | 18 |
| 19 | 1 | 0 | 0 | 1 | 1 | 0 | 1 | 1 | 1 | 0 | 0 | 1 | 0 | 0 | 1 | 0 | 1 | 0 | 0 | 1 | 0 | 1 | 19 |
| 20 | 1 | 0 | 0 | 0 | 1 | 0 | 1 | 0 | 1 | 0 | 0 | 1 | 0 | 0 | 1 | 0 | 0 | 1 | 0 | 1 | 0 | 1 | 20 |
| 21 | 1 | 0 | 0 | 0 | 1 | 0 | 1 | 0 | 1 | 0 | 0 | 1 | 0 | 0 | 1 | 0 | 1 | 0 | 0 | 0 | 0 | 1 | 21 |
| 22 | 1 | 0 | 0 | 1 | 1 | 0 | 1 | 0 | 1 | 0 | 0 | 1 | 1 | 0 | 1 | 0 | 0 | 1 | 1 | 0 | 0 | 1 | 22 |
| 23 | 1 | 0 | 0 | 0 | 1 | 1 | 1 | 0 | 1 | 0 | 0 | 1 | 1 | 0 | 1 | 0 | 0 | 1 | 0 | 1 | 0 | 1 | 23 |

FIG.5

| TIME | HOT ROLLING | THICK PLATE | AP | CONTINUOUS CASTING | SINTERING | ELECTRIC FURNACE | LARGE-DIAMETER TUBE | SMALL-DIAMETER TUBE | OXYGEN CENTER | COLD ROLLING | CONVERTER | BLAST FURNACE BLOWER | SHAFT FURNACE | 2 BLAST FURNACE | RH | SUBSIDIARY A | SUBSIDIARY B | PICKLING FACTORY | CENTRAL OFFICE | BLOOMING REFINING | SUBSIDIARY C | OTHERS | TIME |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 3 |
| 4 | 1 | 0 | 0 | 0 | 0 | 0 | 0 | 0 | 1 | 0 | 1 | 0 | 0 | 0 | 0 | 1 | 0 | 0 | 0 | 0 | 0 | 1 | 4 |
| 5 | 1 | 0 | 1 | 0 | 0 | 0 | 0 | 0 | 1 | 0 | 1 | 0 | 0 | 1 | 0 | 1 | 0 | 0 | 0 | 0 | 0 | 1 | 5 |
| 6 | 1 | 0 | 1 | 0 | 0 | 0 | 0 | 0 | 1 | 0 | 1 | 0 | 0 | 1 | 0 | 1 | 0 | 0 | 0 | 0 | 0 | 1 | 6 |
| 7 | 1 | 0 | 1 | 0 | 0 | 0 | 0 | 0 | 1 | 0 | 1 | 0 | 0 | 1 | 0 | 1 | 0 | 0 | 0 | 0 | 0 | 1 | 7 |
| 8 | 1 | 0 | 0 | 0 | 0 | 0 | 0 | 0 | 1 | 0 | 1 | 0 | 0 | 1 | 0 | 1 | 1 | 0 | 0 | 0 | 0 | 1 | 8 |
| 9 | 1 | 0 | 1 | 0 | 0 | 1 | 0 | 0 | 1 | 0 | 1 | 1 | 0 | 1 | 0 | 1 | 0 | 0 | 0 | 0 | 0 | 0 | 9 |
| 10 | 1 | 0 | 1 | 0 | 0 | 1 | 0 | 0 | 1 | 0 | 1 | 1 | 0 | 1 | 0 | 1 | 0 | 0 | 0 | 0 | 0 | 0 | 10 |
| 11 | 1 | 0 | 1 | 0 | 0 | 1 | 0 | 0 | 1 | 0 | 1 | 1 | 0 | 1 | 0 | 1 | 0 | 0 | 0 | 0 | 0 | 0 | 11 |
| 12 | 1 | 0 | 1 | 0 | 0 | 0 | 0 | 0 | 1 | 0 | 1 | 0 | 0 | 1 | 0 | 1 | 0 | 0 | 0 | 0 | 0 | 1 | 12 |
| 13 | 1 | 0 | 1 | 0 | 1 | 0 | 0 | 0 | 1 | 1 | 1 | 1 | 0 | 1 | 0 | 1 | 0 | 0 | 0 | 0 | 0 | 1 | 13 |
| 14 | 1 | 0 | 1 | 0 | 1 | 0 | 0 | 0 | 1 | 1 | 1 | 0 | 0 | 1 | 0 | 1 | 0 | 0 | 0 | 0 | 0 | 1 | 14 |
| 15 | 1 | 0 | 1 | 0 | 1 | 0 | 0 | 0 | 1 | 1 | 1 | 1 | 0 | 1 | 0 | 1 | 0 | 0 | 0 | 0 | 0 | 1 | 15 |
| 16 | 1 | 0 | 0 | 0 | 1 | 0 | 0 | 0 | 1 | 1 | 1 | 1 | 0 | 1 | 0 | 1 | 0 | 0 | 0 | 0 | 0 | 1 | 16 |
| 17 | 1 | 0 | 0 | 0 | 1 | 0 | 0 | 0 | 1 | 1 | 1 | 1 | 0 | 1 | 0 | 1 | 0 | 0 | 0 | 0 | 0 | 1 | 17 |
| 18 | 1 | 0 | 0 | 0 | 1 | 0 | 0 | 0 | 1 | 0 | 1 | 1 | 0 | 1 | 0 | 1 | 0 | 0 | 0 | 0 | 0 | 1 | 18 |
| 19 | 1 | 0 | 0 | 0 | 1 | 0 | 0 | 0 | 1 | 0 | 1 | 1 | 0 | 1 | 0 | 1 | 0 | 0 | 0 | 0 | 0 | 1 | 19 |
| 20 | 1 | 0 | 0 | 0 | 1 | 0 | 0 | 0 | 1 | 0 | 1 | 0 | 0 | 1 | 0 | 1 | 0 | 0 | 0 | 0 | 0 | 0 | 20 |
| 21 | 1 | 0 | 0 | 0 | 1 | 0 | 0 | 0 | 1 | 0 | 1 | 0 | 0 | 1 | 0 | 1 | 0 | 0 | 0 | 1 | 0 | 0 | 21 |
| 22 | 1 | 0 | 1 | 0 | 1 | 0 | 0 | 0 | 1 | 0 | 1 | 0 | 0 | 1 | 0 | 1 | 0 | 0 | 0 | 1 | 1 | 0 | 22 |
| 23 | 0 | 1 | 1 | 1 | 0 | 0 | 0 | 0 | 1 | 0 | 1 | 0 | 1 | 1 | 0 | 1 | 0 | 0 | 0 | 1 | 1 | 0 | 23 |

FIG.6

| TIME | HOT ROLL-ING | THICK PLATE | AP | CON-TINU-OUS CAST-ING | SIN-TER-ING | ELEC-TRIC FUR-NACE | LARGE-DIAME-TER TUBE | SMALL-DIAME-TER TUBE | OXY-GEN CEN-TER | COLD ROLL-ING | CON-VERT-ER | BLAST FUR-NACE BLOW-ER | SHAFT FUR-NACE | 2 BLAST FUR-NACE | RH | SUB-SIDI-ARY A | SUB-SIDI-ARY B | PICK-LING FAC-TORY | CEN-TRAL OFFICE | BLOOM-ING RE-FINING | SUB-SIDI-ARY C | OTH-ERS | TIME |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 3 |
| 4 | 1 | 1 | 1 | 1 | 1 | 1 | 1 | 0 | 1 | 1 | 1 | 1 | 0 | 1 | 1 | 0 | 0 | 0 | 0 | 0 | 0 | 0 | 4 |
| 5 | 1 | 1 | 1 | 1 | 1 | 1 | 1 | 0 | 1 | 1 | 1 | 1 | 0 | 1 | 1 | 0 | 0 | 0 | 0 | 0 | 0 | 0 | 5 |
| 6 | 1 | 1 | 1 | 1 | 1 | 1 | 1 | 0 | 1 | 1 | 1 | 1 | 0 | 1 | 1 | 0 | 0 | 0 | 0 | 0 | 0 | 0 | 6 |
| 7 | 1 | 1 | 1 | 1 | 1 | 1 | 1 | 0 | 1 | 1 | 1 | 1 | 0 | 1 | 1 | 0 | 0 | 0 | 0 | 0 | 0 | 0 | 7 |
| 8 | 1 | 1 | 1 | 1 | 1 | 1 | 0 | 0 | 1 | 1 | 1 | 1 | 0 | 1 | 1 | 0 | 0 | 0 | 0 | 0 | 0 | 0 | 8 |
| 9 | 1 | 1 | 1 | 1 | 1 | 1 | 0 | 0 | 1 | 1 | 1 | 1 | 0 | 1 | 1 | 0 | 0 | 0 | 0 | 0 | 0 | 0 | 9 |
| 10 | 1 | 1 | 1 | 1 | 1 | 1 | 0 | 0 | 1 | 1 | 1 | 1 | 0 | 1 | 1 | 0 | 0 | 0 | 0 | 0 | 0 | 0 | 10 |
| 11 | 1 | 1 | 1 | 1 | 1 | 1 | 0 | 0 | 1 | 1 | 1 | 1 | 0 | 1 | 1 | 0 | 0 | 0 | 0 | 0 | 0 | 0 | 11 |
| 12 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 12 |
| 13 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 13 |
| 14 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 14 |
| 15 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 15 |
| 16 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 16 |
| 17 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 17 |
| 18 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 18 |
| 19 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 19 |
| 20 | 1 | 1 | 1 | 1 | 1 | 0 | 0 | 0 | 1 | 1 | 1 | 1 | 0 | 1 | 1 | 0 | 0 | 0 | 0 | 0 | 0 | 0 | 20 |
| 21 | 1 | 1 | 1 | 1 | 1 | 0 | 1 | 0 | 1 | 1 | 1 | 1 | 0 | 1 | 1 | 0 | 0 | 0 | 0 | 0 | 0 | 0 | 21 |
| 22 | 1 | 1 | 1 | 1 | 1 | 1 | 1 | 0 | 1 | 1 | 1 | 1 | 0 | 1 | 1 | 0 | 0 | 0 | 0 | 0 | 0 | 0 | 22 |
| 23 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 23 |

FIG.7

FACTORY LIST

UPDATE TIME: 4:00, X MONTH, Y DAY
PRESENT TIME: 4:15, X MONTH, Y DAY

| TIME | HOT ROLL-ING | THICK PLATE | AP | CONTIN-UOUS CASTING | SIN-TER-ING | ELECTRIC FURNACE | LARGE-DIAMETER TUBE | SMALL-DIAMETER TUBE | OXYGEN CENTER | COLD ROLL-ING |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 1 | 1 | 1 | 1 | 1 | 1 | 1 | 0 | 1 | 1 |
| 5 | 1 | 1 | 1 | 1 | 1 | 1 | 1 | 0 | 1 | 1 |
| 6 | 1 | 1 | 1 | 1 | 1 | 1 | 1 | 0 | 1 | 1 |
| 7 | 1 | 1 | 1 | 1 | 1 | 1 | 1 | 0 | 1 | 1 |
| 8 | 1 | 1 | 1 | 1 | 1 | 1 | 0 | 0 | 1 | 1 |
| 9 | 1 | 1 | 1 | 1 | 1 | 1 | 0 | 0 | 1 | 1 |
| 10 | 1 | 1 | 1 | 1 | 1 | 0 | 0 | 0 | 1 | 1 |
| 11 | 1 | 1 | 1 | 1 | 1 | 0 | 0 | 0 | 1 | 1 |
| 12 | 1 | 1 | 1 | 1 | 1 | 0 | 0 | 0 | 1 | 1 |
| 13 | 1 | 1 | 1 | 1 | 1 | 0 | 0 | 0 | 1 | 1 |
| 14 | 1 | 1 | 1 | 1 | 1 | 0 | 0 | 0 | 1 | 1 |
| 15 | 1 | 1 | 1 | 1 | 1 | 0 | 0 | 0 | 1 | 1 |
| 16 | 1 | 1 | 1 | 1 | 1 | 0 | 0 | 0 | 1 | 1 |
| 17 | 1 | 1 | 1 | 1 | 1 | 0 | 0 | 0 | 1 | 1 |
| 18 | 1 | 1 | 1 | 1 | 1 | 0 | 0 | 0 | 1 | 1 |
| 19 | 1 | 1 | 1 | 1 | 1 | 0 | 0 | 0 | 1 | 1 |
| 20 | 1 | 1 | 1 | 1 | 1 | 0 | 0 | 0 | 1 | 1 |
| 21 | 1 | 1 | 1 | 1 | 1 | 0 | 0 | 0 | 1 | 1 |
| 22 | 1 | 1 | 1 | 1 | 1 | 0 | 1 | 0 | 1 | 1 |
| 23 | 1 | 1 | 1 | 1 | 1 | 0 | 1 | 1 | 1 | 1 |

PRESENT TIME POINT ← 4

GUIDANCE DEVICE FOR SELECTING SAFETY FACTORY, GUIDANCE METHOD FOR SELECTING SAFETY FACTORY, AND METHOD OF OPERATING FACTORY

FIELD

The present invention relates to a guidance device for selecting a safety factory, a guidance method for selecting a safety factory, and a method of operating a factory.

BACKGROUND

In an energy management process of a factory, management, such as reducing a power purchase amount by energy operation in accordance with a power price and selling surplus of generated power to a power company, is performed by grasping power demand-supply of the factory. In contrast, when a power source supplied from the outside of a power company and the like goes off or is turned off (hereinafter, referred to as power-off), a stable operation that does not cause a power failure in a system is required due to a decrease in an energy supply amount. Measures such as lowering production capacity of a factory and stopping operation of the factory are required. From such a background, Patent Literature 1 proposes a method of controlling the operation of a rolling mill such that the operation falls within a range of power that can be supplied by private power generation at the time of power-off.

CITATION LIST

Patent Literature

Patent Literature 1: JP S61-221535 A

SUMMARY

Technical Problem

In the method described in Patent Literature 1, however, the operation of a specific factory is significantly restricted. In addition, the operation may fail to fall within the range of power that can be supplied by private power generation only by controlling the operation of the specific factory. Furthermore, the factory may be stopped to prioritize power selling depending on a power selling unit price. Thus, a safety operation plan for a factory (Operation/non-operation of a factory is determined in accordance with power demand-supply. In this case, a factory to be operated is referred to as a safety factory) can be desirably created as the entire system.

The present invention has been made in view of the above-described problems, and an object thereof is to provide a guidance device and a guidance method for selecting a safety factory, which can calculate a safety operation plan for a factory such that the operation falls within a range in which power can be supplied and present a combination of an operating factory and a non-operating factory. Furthermore, another object of the present invention is to provide a factory operating method capable of operating a factory such that operation falls within a power range in which power can be supplied.

Solution to Problem

A guidance device according to the present invention for selecting a safety factory operating at a time of a power failure, and presenting a safety operation plan for a plurality of factories in a power system, includes a presentation unit configured to calculate a combination of an operating factory and a non-operating factory within a predetermined period from a planned value of power demand-supply of the factories such that a power consumption amount of the factories satisfies a predetermined condition, and present information on the calculated combination.

The presentation unit may be configured to calculate the combination in accordance with a constraint condition for inhibiting number of times of changing an operation state of the factories within the predetermined period.

The plurality of factories may be preliminarily classified into a group of a factory to operate, a group of a factory to stop operating, and a group of another factory, and the presentation unit may be configured to calculate the combination of an operating factory and a non-operating factory for the factory classified into the group of another factory.

A guidance method according to the present invention for selecting a safety factory operating at a time of a power failure, and presenting a safety operation plan for a plurality of factories in a power system, includes the steps of: calculating a combination of an operating factory and a non-operating factory within a predetermined period from a planned value of power demand-supply of the factories such that a power consumption amount of the factories satisfies a predetermined condition; and presenting information on the calculated combination.

A method of operating a factory according to the present invention includes a step of operating a factory in accordance with the information on the combination of the operating factory and the non-operating factory, the information being presented by the guidance method for selecting a safety factory, according to the present invention.

Advantageous Effects of Invention

According to the guidance device and the guidance method for selecting a safety factory of the present invention, a safety operation plan for a factory can be calculated such that operation falls within a power range in which power can be supplied, and a combination of an operating factory and a non-operating factory can be presented. Furthermore, according to a method of operating a factory of the present invention, the factory can be operated such that the operation falls within a power range in which power can be supplied.

BRIEF DESCRIPTION OF DRAWINGS

FIG. 4 illustrates one example of a status of selection of operation/non-operation of a factory.

FIG. 5 illustrates one example of the status of selection of operation/non-operation of a factory.

FIG. 6 illustrates one example of the status of selection of operation/non-operation of a factory.

FIG. 7 illustrates one example of a guidance screen.

DESCRIPTION OF EMBODIMENTS

A guidance device for selecting a safety factory, which is an embodiment of the present invention, will be described below with reference to the drawings.

[Configuration]

First, the configuration of the guidance device for selecting a safety factory, which is the embodiment of the present invention, will be described with reference to FIG. 1.

Figure 1:
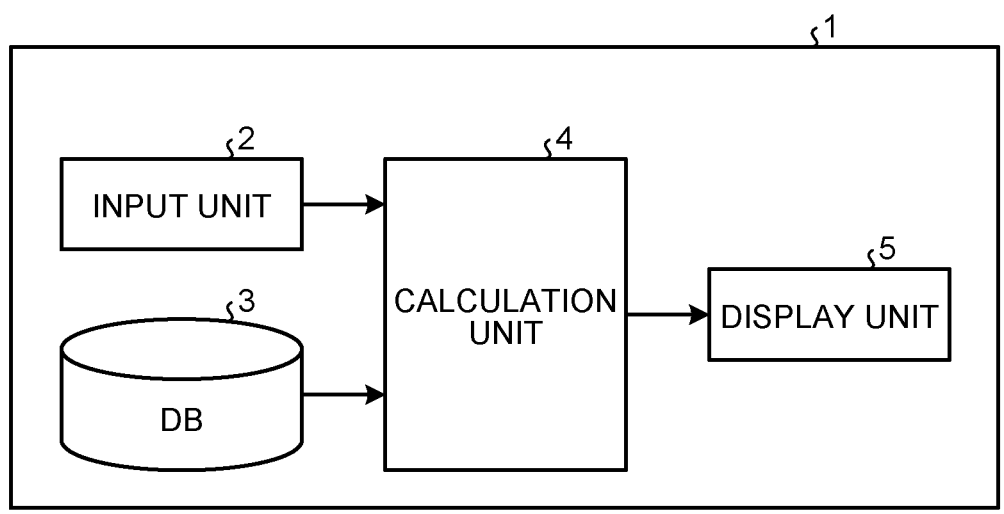
FIG. 1 is a block diagram illustrating the configuration of a guidance device for selecting a safety factory, which is an embodiment of the present invention.

FIG. 1 is a block diagram illustrating the configuration of the guidance device for selecting a safety factory, which is the embodiment of the present invention. As illustrated in FIG. 1, a guidance device 1 for selecting a safety factory, which is the embodiment of the present invention, creates and presents a safety operation plan for a plurality of factories in a power system of a steel mill, and includes a general-purpose information processing device such as a personal computer and a workstation. In the present embodiment, the guidance device 1 for selecting a safety factory includes an input unit 2, a database (DB) 3, a calculation unit 4, and a display unit 5.

The input unit 2 is an operation input unit to the calculation unit 4, and includes an input device such as a keyboard, a mouse pointer, and a numeric keypad. The input unit 2 outputs an operation input signal to the calculation unit 4.

The database 3 stores information on power demand-supply plans for a plurality of factories to be managed in a form readable by the calculation unit 4.

The calculation unit 4 includes a processor and a memory (main storage unit). The processor includes, for example, a central processing unit (CPU). The memory (main storage unit) includes a random access memory (RAM), a read only memory (ROM), and the like. The calculation unit 4 loads and executes a computer program in a work area of the main storage unit, and implements a function matching a predetermined object by controlling each component and the like through execution of the computer program.

The display unit 5 includes a general-purpose display device such as a liquid crystal display device, and displays and outputs various pieces of information in accordance with a control signal from the calculation unit 4.

The guidance device 1 for selecting a safety factory having such configuration executes guidance processing to be described below to calculate a safety operation plan for a factory such that operation falls within a power range in which power can be supplied, and present a combination of an operating factory and a non-operating factory to an operator. Hereinafter, the operation of the guidance device 1 for selecting a safety factory at the time when the guidance processing is executed will be described with reference to a flowchart in FIG. 2.

[Guidance Processing]

Figure 2:
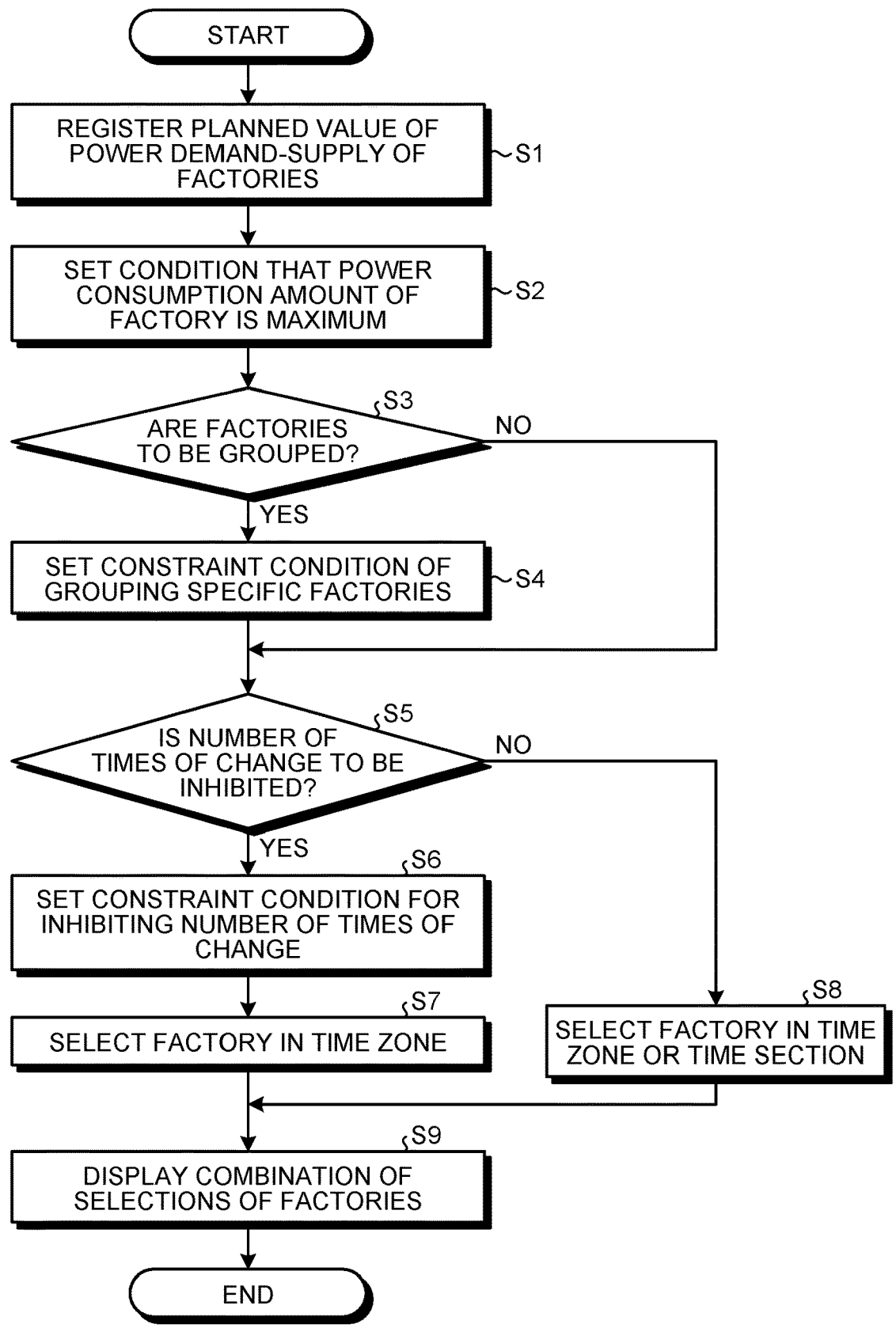
FIG. 2 is a flowchart illustrating the flow of guidance processing, which is the embodiment of the present invention.

FIG. 2 is the flowchart illustrating the flow of the guidance processing, which is the embodiment of the present invention. The flowchart in FIG. 2 starts at the timing when an execution command and a setting value for the guidance processing are input via the input unit 2. The guidance processing proceeds to processing of Step S1.

In the processing of Step S1, the calculation unit 4 reads information on power demand-supply plans for factories to be managed from the DB 3, and registers a planned value of power demand-supply of the factories to be managed within a predetermined period based on the read information. Note that the planned value of power demand-supply of the factories may be a predetermined fixed value, a predicted value determined by a regression expression based on a rolling plan and a steelmaking plan of a steel mill, and the like. As a result, the processing of Step S1 is completed, and the guidance processing proceeds to Step S2.

In the processing of Step S2, the calculation unit 4 sets creation of a safety operation plan for a factory within a predetermined period under the condition that the power consumption amount of the factory is maximum within a range of a private power generation amount based on the setting value input from the input unit 2. Note that the power consumption amount of the factory does not necessarily need to indicate the maximum value, and is only required to have a value asymptotic to the maximum value. Furthermore, in addition to the condition that the power consumption amount of the factory is maximum, a condition that a sold power amount is maximum may be set. As a result, the processing of Step S2 is completed, and the guidance processing proceeds to Step S3.

In the processing of Step S3, the calculation unit 4 determines whether or not to group factories into, for example, a group of factories to operate, a group of factories to stop operating, a group of other factories, and the like based on the setting value input from the input unit 2. When the factories are grouped as a result of the determination (Step S3: Yes), the calculation unit 4 advances the guidance processing to Step S4. In contrast, when the factories are not grouped (Step S3: No), the calculation unit 4 advances the guidance processing to Step S5.

In the processing of Step S4, the calculation unit 4 sets a constraint condition at the time of calculating a safety operation plan of grouping the factories. A specific example of the constraint condition will be described later. A plurality of factories is preliminarily classified into a group of factories to operate, a group of factories to stop operating, and a group of other factories, and a combination of selections of a factory/factories of operation/non-operation is calculated for factories classified into the group of other factories, which can facilitate the selections of a factory/factories of operation/non-operation.

Note that factories may be grouped in accordance with operation priority. Specifically, a raw material is tapped as molten iron in a blast furnace of a steel mill. If the operation of the blast furnace is temporarily stopped, a long time is required for recovery. Thus, the operation of the blast furnace is desired to be maintained. Furthermore, since the blast furnace needs a supply of not only electric power but oxygen, an oxygen plant is required to be operated to prevent the lack of oxygen. Moreover, a blast furnace blower is also required to be operated to continue the supply. Therefore, the blast furnace, the oxygen plant, and the blast furnace blower may be classified into a group having high operation priority. Similarly, there are integrally operated facilities, such as a converter and a continuous casting machine. In such facilities, if one facility is stopped, the other facility is forced to stop. Facilities included in such a facility group of a main production line in the steel mill may be collectively classified into a group having high operation priority.

Furthermore, the factories may be grouped in accordance with the magnitude of the amplitude and cycle of power fluctuation. Specifically, in a rolling mill, the power consumption increases when a semi-finished product such as a continuously cast slab is rolled, whereas the power consumption decreases at the time of idling, so that the power fluctuation has a large amplitude in a relatively short cycle. In contrast, in a factory or a business that always operates at a constant level, the power fluctuation has a small amplitude in a relatively long cycle. Therefore, these factories may be grouped and treated as a factory group of constant power.

Furthermore, two factories having similar levels of amplitude and cycle of the power fluctuation and the opposite phases of the fluctuation may be classified into the same group. Specifically, if similar pieces of rolling are alternately performed in rolling mills of the same power system and the same scale, it appears that constant power is used, so that leveling can be expected. Therefore, the rolling mills of the same power system and the same scale may be classified into the same group. As a result, the processing of Step S4 is completed, and the guidance processing proceeds to Step S5.

In the processing of Step S5, the calculation unit 4 determines whether or not to inhibit the number of times of change in the selections of a factory/factories of operation/non-operation based on the setting value input from the input unit 2. When the number of times of change in the selections of a factory/factories of operation/non-operation is inhibited as a result of the determination (Step S5: Yes), the calculation unit 4 advances the guidance processing to Step S6. In contrast, when the number of times of change in the selections of a factory/factories of operation/non-operation is not inhibited (Step S5: No), the calculation unit 4 advances the guidance processing to Step S8.

In the processing of Step S6, the calculation unit 4 sets a constraint condition at the time of calculating a safety operation plan in a case where the number of times of change in the selections of a factory/factories of operation/non-operation is inhibited. A specific example of the constraint condition will be described later. A labor of an operator who switches operation/non-operation of a factory can be reduced by inhibiting the number of times of change in the selections of a factory/factories of operation/non-operation. As a result, the processing of Step S6 is completed, and the guidance processing proceeds to Step S7.

In the processing of Step S7, the calculation unit 4 calculates a safety operation plan for a factory, which satisfies the calculation condition and the constraint condition set in the processing of Step S2, by using the planned value of the power demand-supply of the factory, which has been registered in the processing of Step S1. Then, the calculation unit 4 calculates a combination of the selections of a factory/factories of operation/non-operation in a time zone within a predetermined period from the calculated safety operation plan. As a result, the processing of Step S7 is completed, and the guidance processing proceeds to Step S9.

In the processing of Step S8, the calculation unit 4 calculates a safety operation plan for a factory, which satisfies the calculation condition and the constraint condition set in the processing of Step S2, by using the planned value of the power demand-supply of the factory, which has been registered in the processing of Step S1. Then, the calculation unit 4 calculates a combination of the selections of a factory/factories of operation/non-operation in a time zone within a certain predetermined period or a certain time section (time point) from the calculated safety operation plan. As a result, the processing of Step S8 is completed, and the guidance processing proceeds to Step S9.

In the processing of Step S9, the calculation unit 4 displays, on the display unit 5, information (guidance screen) on the combination of selections of a factory/factories/factories of operation/non-operation calculated in the processing of Step S7 or S8. As a result, the processing of Step S9 is completed, and a series of guidance processing ends.

EXAMPLES

In an example, the present invention was applied to processing of selecting a factory to be operated or not to be operated such that a power consumption amount of the factory is maximized within a range of a private power generation amount in the case where a power failure occurs due to interruption of power supply from the outside and a part of a power source in a power system is turned off. Note that, in the example, an ideal situation in which power consumption of a factory can be accurately grasped was assumed, and an actual value was used as a power value of the factory. Then, under the assumption, an integer programming problem was created and a combination of selections of a factory/factories of operation/non-operation was calculated for three cases of a case (a) where the number of times of change in the selections of a factory/factories of operation/non-operation is not inhibited, a case (b) where the number of times of change in the selections of a factory/factories of operation/non-operation is inhibited but factories are not grouped, and a case (c) where the number of times of change in the selections of a factory/factories is inhibited and the factories are grouped.

Specifically, the following problem (a) was set for the case (a) where the number of times of change in the selections of a factory/factories of operation/non-operation is not inhibited. Note that, when a sold power amount is desired to be considered in the problem, a term indicating the sold power amount is only required to be added to an objective function.

Problem (a)
  Objective function: Minimize $\Sigma_t$ {$\Sigma_p$ private power generation amount [t] [p]−$\Sigma_i$ factory selection [t] [i]× factory power amount [t] [i]}
  Decision variable: Factory selection [t] [i]∈{0, 1}(0: not selected (not operated), 1: selected (operated))
  Constraint condition: Factory power amount [t] [i]=actual value, objective function≥0.1 MWh
  Subscript: p: Generator name, i: Factory name, t: Time Furthermore, in the case (b) where the number of times of change in the selections of a factory/factories of operation/non-operation is inhibited but factories are not grouped, a problem (b) obtained by adding the following constraint conditions to the problem (a) was set. The following constraint conditions are that a factory cannot be selected as a factory to be switched between operation and non-operation unless the operation time and the stop time continue for four hours.

Operation continuation (four hours): Factory selection [t] [i]−factory selection [t−1] [i]≤factory selection [t+T] [i], T∈{1, 2, 3}
  Stop continuation (four hours): Factory selection [t−1] [i]−factory selection [t] [i]≤1−factory selection [t+T2] [i], T2∈{1, 2, 3}

Furthermore, in the case (c) where the number of times of change in the selections of a factory/factories is inhibited and the factories are grouped, a problem (c) obtained by adding the following constraint conditions to the problem (b) was set. Here, factories are grouped such that a factory considered to be minimum necessary for operating a steel mill is prioritized.

Operate during power failure: Factory selection [t] [j]=1, j∈A=main factory of steel mill={blast furnace blower, blast furnace, oxygen center, sintering, converter, AP, RH, continuous casting, hot rolling, thick plate, cold rolling}

Not operate during power failure: Factory selection [t][j]=0, j∈B=streetlamp and the like of steel mill={others}

Grouping of specific factories: Factory selection [t][k]=factory selection [t] [l], k, l∈C=office, subsidiary, and the like={subsidiary A, subsidiary B, pickling factory, central office, blooming refining, shaft furnace}

Figure 3:
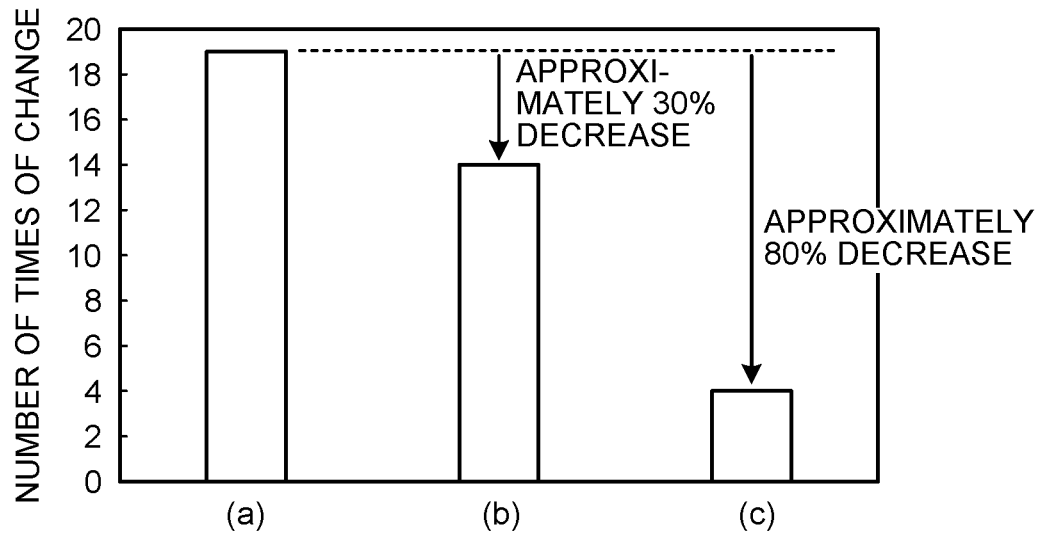
FIG. 3 illustrates one example of the number of times of change in operation/non-operation of a factory.

FIG. 3 illustrates the number of times of change in operation/non-operation of a factory in each case as a calculation result of selections of a factory/factories of operation/non-operation in a certain time zone (20 hours). In the case (a), operation/non-operation of a factory is changed each time. The number of times of change is reduced by approximately 30% in the case (b) and the number of times of change is reduced by approximately 80% in the case (c) as compared with that in the case (a). A burden on an operator can be reduced and operation efficiency can be improved by reducing the number of times of change. Furthermore, FIGS. 4, 5, and 6 illustrate a factory selection status in each case. The example illustrates operation/non-operation of a factory at each subsequent time of each case by setting the state of operation/non-operation of each factory at times 0 to 3 as an initial state. In FIGS. 4 to 6, 1 indicates selection (operation), and 0 indicates non-selection (non-operation). Any state is assumed as the initial state. Here, a case where all are in an unselected state is assumed. A hatched portion indicates a time point when a change in operation/non-operation occurs. Moreover, FIG. 7 illustrates one example of guidance screen display. The operator adjusts the operation state of a factory with reference to the guidance screen in FIG. 7. Note that, in the example of FIGS. 4 and 5, the operation/non-operation of a factory is selected on the assumption of the case where the relation between factories does not need to be considered. Actually, the factories have interdependent relation in operation. A problem may occur unless the operation/non-operation is simultaneously selected. In such a case, the grouping in (c) in FIG. 7 is only required to be performed. In FIG. 7, the operation/non-operation of each factory is selected including other factories that perform processing essential for operating each factory by designating a factory group essential for operating a steel mill as a priority group. Thus, factory selection that makes operation of the steel mill impossible is not performed. The operation/non-operation of a factory can be selected within a range in which power can be supplied.

Although the embodiment to which the invention made by the present inventors is applied has been described above, the present invention is not limited by the description and drawings constituting a part of the disclosure of the present invention according to the embodiment. That is, other embodiments, examples, operation techniques, and the like made by those skilled in the art based on the present embodiment are all included in the scope of the present invention.

INDUSTRIAL APPLICABILITY

According to the present invention, there can be provided a guidance device and a guidance method for selecting a safety factory, which can calculate a safety operation plan for a factory such that operation falls within a range in which power can be supplied and present a combination of an operating factory and a non-operating factory. Furthermore, according to the present invention, there can be provided a factory operating method capable of operating a factory such that the operation falls within a power range in which power can be supplied.

REFERENCE SIGNS LIST

1 GUIDANCE DEVICE FOR SELECTING SAFETY FACTORY
2 INPUT UNIT
3 DATABASE (DB)
4 CALCULATION UNIT
5 DISPLAY UNIT

The invention claimed is:

1. A guidance device for selecting a safety factory operating at a time of a power failure, and presenting a safety operation plan for a plurality of factories in a power system, the guidance device comprising
a processor configured to:
calculate a combination of an operating factory and a non-operating factory within a predetermined period from a planned value of power demand-supply of the factories such that a power consumption amount of the factories satisfies a predetermined condition,
present information on the calculated combination, and
operate a factory by controlling the power consumption in accordance with the information on the combination of the operating factory and the non-operating factory, wherein
the processor is configured to calculate the combination in accordance with a constraint condition for inhibiting a number of times of changing an operation state of the factories by prohibiting the factory to be selected as a factory to be switched between operation and non-operation unless operation time and stop time continue for a predetermined time within the predetermined period.

2. The guidance device for selecting a safety factory according to claim 1, wherein
the plurality of factories are preliminarily classified into a group of a factory to operate, a group of a factory to stop operating, and a group of another factory, and
the processor is configured to calculate the combination of an operating factory and a non-operating factory for the factory classified into the group of another factory.

3. The guidance device for selecting a safety factory according to claim 2, wherein when the factories have interdependent relations in operation, the processor is configured to select operation and non-operation of the factories having interdependent relation in operation simultaneously.

4. A guidance method for selecting a safety factory operating at a time of a power failure, and presenting a safety operation plan for a plurality of factories in a power system, the guidance method comprising the steps of:
calculating a combination of an operating factory and a non-operating factory within a predetermined period from a planned value of power demand-supply of the factories such that a power consumption amount of the factories satisfies a predetermined condition;
presenting information on the calculated combination; and
operating a factory by controlling the power consumption in accordance with the information on the combination of the operating factory and the non-operating factory, wherein
the combination is calculated in accordance with a constraint condition for inhibiting a number of times of changing an operation state of the factories by prohibiting the factory to be selected as a factory to be switched between operation and non-operation unless operation time and stop time continue for a predetermined time within the predetermined period.

* * * * *